(12) United States Patent
Thubert et al.

(10) Patent No.: US 12,389,305 B2
(45) Date of Patent: Aug. 12, 2025

(54) PERIMETER FORMATION AND MOBILE DEVICE DETECTION IN A RPL NETWORK

(71) Applicant: Cisco Technology, Inc., San Jose, CA (US)

(72) Inventors: Pascal Thubert, Roquefort les Pins (FR); Lele Zhang, Shanghai (CN); Huimin She, Shanghai (CN); Li Zhao, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 663 days.

(21) Appl. No.: 17/712,381

(22) Filed: Apr. 4, 2022

(65) Prior Publication Data

US 2023/0319683 A1 Oct. 5, 2023

(51) Int. Cl.
*H04W 40/24* (2009.01)
*H04W 84/18* (2009.01)

(52) U.S. Cl.
CPC .......... *H04W 40/246* (2013.01); *H04W 84/18* (2013.01)

(58) Field of Classification Search
CPC ............................ H04W 40/246; H04W 84/18
See application file for complete search history.

(56) References Cited

U.S. PATENT DOCUMENTS

| | | | |
|---|---|---|---|
| 8,102,775 B2 | 1/2012 | Thubert | |
| 8,527,457 B2 | 9/2013 | Moon et al. | |
| 9,088,502 B2 | 7/2015 | Thubert et al. | |
| 9,253,748 B2 | 2/2016 | Goldin | |
| 10,412,010 B1 | 9/2019 | Thubert et al. | |
| 10,856,170 B1* | 12/2020 | Xia | ........................ H04L 67/568 |
| 10,938,707 B2* | 3/2021 | She | ..................... H04L 67/1042 |
| 11,022,672 B1 | 6/2021 | Chartier et al. | |

(Continued)

FOREIGN PATENT DOCUMENTS

WO 2020114111 A1 6/2020

OTHER PUBLICATIONS

Heile et al., "Wi-SUN FAN Overview", lpwan Internet Draft, Jul. 3, 2017, [online], [retrieved on Aug. 20, 2019]. Retrieved from the Internet: URL: <https://tools.ietf.org/pdf/draft-heile-lpwan-wisun-overview-00.pdf>, pp. 1-15.

(Continued)

*Primary Examiner* — Chandrahas B Patel
(74) *Attorney, Agent, or Firm* — BEHMKE INNOVATION GROUP LLC; James M. Behmke

(57) ABSTRACT

In one embodiment, a method comprises: creating, by a root network device in a wireless data network, a perimeter topology comprising a first distance vector-protocol path of a first group of perimeter devices and a second distance vector-protocol path of a second group of the perimeter devices, the creating comprising outputting first and second advertisement messages causing the perimeter devices to attach to only one parent of only one of the first or second distance vector-protocol paths and a junction device to attach at respective ends of the first and second distance vector-protocol paths; and causing the junction device to forward, from the first distance vector-protocol path, a data packet toward the root network device via the second distance vector-protocol path.

19 Claims, 6 Drawing Sheets

(56) References Cited

U.S. PATENT DOCUMENTS

| | | | |
|---|---|---|---|
| 2017/0193781 A1 | 7/2017 | Bryson et al. | |
| 2020/0014618 A1 | 1/2020 | Thubert et al. | |
| 2020/0344159 A1* | 10/2020 | Thubert | H04L 45/48 |
| 2023/0327975 A1* | 10/2023 | White | H04L 41/0631 |
| | | | 370/254 |

OTHER PUBLICATIONS

Ellis, "Researchers deploy virtual fencing technology to improve grazing and water quality", Oklahoma State University, Jun. 24, 2021, [online], [retrieved on Mar. 24, 2022]. Retrieved from the Internet: URL: <https://news.okstate.edu/articles/agriculture/2021/ellis_virtual_fencing.html>, 3 pages.

Invisible Fence, 2022, [online], [retrieved on Mar. 24, 2022]. Retrieved from the Internet: URL: <https://www.invisiblefence.com/>, 9 pages.

Nofence, [online], [retrieved on Mar. 24, 2022]. Retrieved from the Internet: URL: <https://www.nofence.no/en/what-is-nofence>, 5 pages.

Cisco, "Resilient Ethernet Protocol Overview", Jul. 22, 2016, [online], [retrieved on Mar. 24, 2022]. Retrieved from the Internet: URL: <https://www.cisco.com/c/en/us/support/docs/lan-switching/ethernet/116384-technote-rep-00.html>, pp. 1-14.

Hui, Ed., et al., "Compression Format for IPV6 Datagrams over IEEE 802.15.4-Based Networks", Internet Engineering Task Force (IETF), Request for Comments: 6282, Sep. 2011, [online], [retrieved on Feb. 18, 2021]. Retrieved from the Internet: URL: <https://tools.ietf.org/pdf/rfc6282.pdf>, pp. 1-24.

Winter, Ed., et al., "RPL: IPv6 Routing Protocol for Low-Power and Lossy Networks", Internet Engineering Task Force (IETF), Request for Comments: 6550, Mar. 2012, pp. 1-157.

Thubert, Ed., et al., "Routing for RPL (Routing Protocol for Low-Power and Lossy Networks) Leaves", Internet Engineering Task Force (IETF), Request for Comments: 9010, Apr. 2021, [online], [retrieved on Mar. 24, 2022]. Retrieved from the Internet: URL: < https://www.rfc-editor.org/rfc/rfc9010.pdf>, pp. 1-36.

Spoton GPS Fence, [online], [retrieved on Mar. 24, 2022], Retrieved from the Internet: URL: <https://spotonfence.com/pages/how-it-works>, pp. 1-19.

* cited by examiner

PERIMETER FORMATION AND MOBILE DEVICE DETECTION IN A RPL NETWORK

TECHNICAL FIELD

The present disclosure generally relates to perimeter formation and mobile device detection in a RPL network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Large-scale wireless mesh networks can be deployed in the form of Internet Protocol version 6 (IPv6) wireless radio frequency (RF) mesh networks, deployed for example using wireless link layer protocols such as IEEE 802.15.4e and/or IEEE 802.15.4g (referred to herein as "IEEE 802.15.4e/g"), and/or Wireless Smart Utilities Network (Wi-SUN) according to the example IETF Internet Draft by Heile et al., "Wi-SUN FAN Overview" (draft-heile-lpwan-wisun-overview-00). Such large-scale wireless mesh networks (also referred to as field area networks (FANs)) can be used for deployment of, for example, a connected grid mesh (CG-mesh) network advanced metering infrastructure (AMI). The CG-mesh network can include hundreds or thousands of IEEE 802.15.4e/g based resource-constrained (e.g., low-power) network devices (also referred to herein as Low Power and Lossy Network (LLN) devices), where each LLN device can reach, within its transmission range, hundreds of neighboring network devices.

The Low-power and Lossy Network (LLN) can include dozens or thousands of low-power network devices: in some cases the LLN can be limited to a wireless mesh network; the LLN devices also can be configured for routing data packets according to a routing protocol designed for such low power and lossy networks, for example "RPL" (Routing Protocol for Low-Power and Lossy Networks) according to the IETF Request for Comments (RFC) 6550, or 6LoWPAN (according to RFC 6282), etc. The low-power devices, also referred to as "constrained devices" can be constrained by processing power, memory, and energy (e.g., battery power), and therefore may require substantially-long sleep states ("standby" states) in between relatively-short active states for execution of different execution states. Further, noise and/or interference on a wireless RF channel can affect communications between LLN devices, resulting in unreliable data links that can be constrained by high loss rates, low data rates, and instability with relatively low packet delivery rates in the LLN.

A particular problem in a RPL network is that it is not well-suited for perimeter security applications, where movable network devices (e.g., RFID tags attached to individuals, livestock, wildlife, mobile robotic devices) within a prescribed perimeter (e.g., a farm or ranch, wilderness preserve, a playground, etc.) need to be identified if approaching or passing beyond the prescribed perimeter. Existing technologies based on Global Navigation Satellite System (GNSS) or Wi-Fi can be relatively costly due to additional wireless hardware chips (e.g., System on a Chip (Soc); further, GNSS is unusable for an indoor environment.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
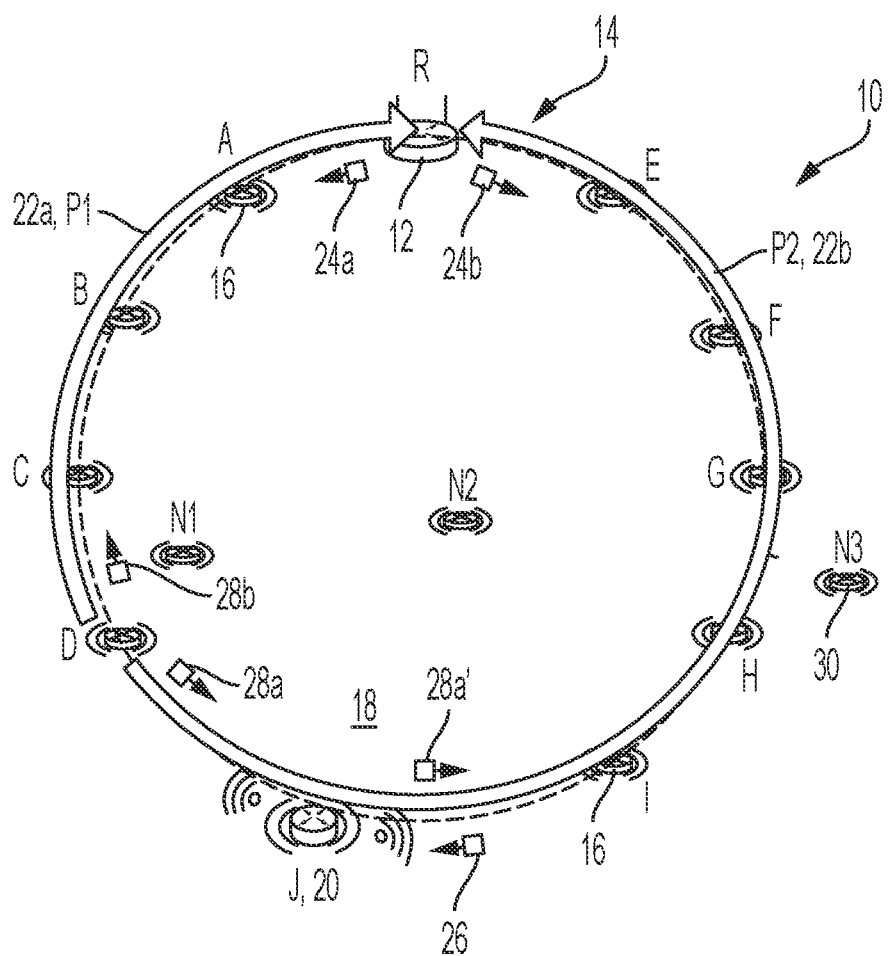
FIG. 1 illustrates a wireless data network comprising a root network device configured for establishing a perimeter topology comprising first and second distance vector-protocol paths and a junction device attached to the first and second distance vector-protocol paths, for routing data packets between the first and second distance vector-protocol paths, according to an example embodiment.

In one embodiment, a method comprises: creating, by a root network device in a wireless data network, a perimeter topology comprising a first distance vector-protocol path of a first group of perimeter devices and a second distance vector-protocol path of a second group of the perimeter devices, the creating comprising outputting first and second advertisement messages causing the perimeter devices to attach to only one parent of only one of the first or second distance vector-protocol paths and a junction device to attach at respective ends of the first and second distance vector-protocol paths; and causing, by the root network device, the junction device to forward, from the first distance vector-protocol path, a data packet toward the root network device via the second distance vector-protocol path.

In another embodiment, one or more non-transitory tangible media are encoded with logic for execution by a machine and when executed by the machine operable for: creating, by the machine implemented as a root network device in a wireless data network, a perimeter topology comprising a first distance vector-protocol path of a first group of perimeter devices and a second distance vector-protocol path of a second group of the perimeter devices, the creating comprising outputting first and second advertisement messages causing the perimeter devices to attach to only one parent of only one of the first or second distance vector-protocol paths and a junction device to attach at respective ends of the first and second distance vector-protocol paths; and causing the junction device to forward, from the first distance vector-protocol path, a data packet toward the root network device via the second distance vector-protocol path.

In another embodiment, an apparatus is implemented as a physical machine and comprises: non-transitory machine readable media configured for storing executable machine readable code; a device interface circuit configured for outputting first and second advertisement messages; and a processor circuit. The processor circuit is configured for executing the machine readable code, and when executing the machine readable code operable for: creating, by the apparatus implemented as a root network device in a wireless data network, a perimeter topology comprising a first distance vector-protocol path of a first group of perimeter devices and a second distance vector-protocol path of a second group of the perimeter devices, the creating comprising generating the first and second advertisement messages causing the perimeter devices to attach to only one parent of only one of the first or second distance vector-protocol paths and a junction device to attach at respective ends of the first and second distance vector-protocol paths; and causing the junction device to forward, from the first distance vector-protocol path, a data packet toward the root network device via the second distance vector-protocol path.

In another embodiment, one or more non-transitory tangible media are encoded with logic for execution by a machine and when executed by the machine operable for: receiving, by the machine implemented as a wireless network device, an instruction by a root network device to operate as a junction device for first and second distance vector-protocol paths initiated at the root network device; joining, by the wireless network device, first and second parent network devices in response to receiving first and second advertisement messages advertising the first and second distance vector-protocol paths, respectively; and forwarding, by the wireless network device, a data packet received from the first distance vector-protocol path to the root network device via the second distance vector-protocol path.

DETAILED DESCRIPTION

Particular embodiments enable a root network device, in a low power and lossy network (LLN), to establish a low-cost perimeter topology for detection of mobile network devices that are approaching a perimeter of perimeter devices having respective prescribed positions around a prescribed detection area. The root network device can establish the perimeter topology based on generating and outputting first and second advertisement messages identifying formation of respective first and second distance vector-protocol paths, for example according to the RPL protocol according to RFC 6550.

FIG. 1 illustrates a wireless low power and lossy data network 10 comprising a root network device "R" 12 configured for establishing a perimeter topology 14 overlying a link layer mesh network, perimeter devices 16 at prescribed positions around a prescribed detection area 18, and a junction device 20. The root network device "R" 12 is configured for creating a perimeter topology 14 comprising first and second distance vector-protocol paths "P1" 22a and "P2" 22b, illustrated in FIG. 1, based on sending first and second advertisement messages 24a and 24b. The root network device "R" 12 also is configured for sending, to the junction device "J" 20, an instruction message 26 that designates the network device 20 as a junction device "J" for the distance vector-protocol path "P1" 22a and the distance vector-protocol path "P2" 22b. Each of the network devices 12, 16, and 20 can be implemented as Wi-SUN devices that are having prescribed positions around at the edge of a detection area 18, enabling the perimeter topology 14 to form a virtual fence.

The first and second advertisement messages 24a and 24b, implemented for example as storing mode destination-oriented directed acyclic graph (DODAG) information object (DIO) messages, can cause perimeter devices 16 (located at respective prescribed positions within the prescribed detection area 18) to selectively attach to the root network device "R" 12 (or a child) for formation of the distance vector-protocol path "P1" 22a (comprising the perimeter devices "A", "B", "C", and "D" 16) and the distance vector-protocol path "P2" 22b (comprising the perimeter devices "E", "F", "G", "H", and "I" 16), respectively. As described below, each DIO advertisement message 24a and 24b can identify instructions (e.g., an objective function) that causes each perimeter device 16 to attach to only one parent of only one of the first distance vector-protocol path "P1" 22a or the distance vector-protocol path "P2" 22b, causing each distance vector-protocol path 22 to be implemented as a "line" of perimeter devices 16. Each DIO advertisement message 24a and 24b also can specify that each perimeter device 16 can selectively replicate and transmit a data packet 28 (originated from a source inside or outside the perimeter topology 14, for example) toward the root network device "R" 12 and a replicated copy away from the root network device "R" via an attached child network device, described below.

In contrast, the instruction message 26 can cause the junction device "J" 20 to attach to respective ends of the distance vector-protocol path "P1" 22a and the distance vector-protocol path "P2" 22b, for formation of the perimeter topology 14 as a "loop" of connected perimeter devices 16 in the distance vector-protocol path "P1" 22a and the distance vector-protocol path "P2" 22b, connected at each end by the junction device "J" 20 and the root network device "R" 12.

Hence, the attachment of the junction device "J" 20 to the ends of the first and second distance vector-protocol paths "P1" and "P2" enable the junction device "J" 20 to forward a data packet 28a, received from its parent network device "D" 16 in the distance vector-protocol path "P1" 22a, toward the root network device "R" 12 via the distance vector-protocol path "P2" 22b. As described below, the junction device "J" 20 also can prevent packet looping of a data packet 28a in the perimeter topology 14 based on changing an indicator in the data packet 28a received from the distance vector-protocol path "P1" 22a, indicating a direction of the data packet 28a, from a first direction (away from the root network device "R" 12) to a second direction (toward the root network device "R" 12), prior to outputting the modified data packet 28a' to the root network device "R" 12 via the distance vector-protocol path "P2" 22b.

Hence, the example embodiments enables formation of a perimeter topology 14 that enables tracking of mobile devices (e.g., "N1", "N2", and/or "N3") 30 that can approach the perimeter devices 16 from inside the perimeter topology 14 (e.g., mobile devices "N1" or "N2" 30) or outside the perimeter topology 14 (e.g., mobile device "N3" 30). As described below, each mobile device 30 can be tracked based on one or more perimeter devices (e.g., "D") 16 detecting a beacon message (e.g., an IEEE 802.15.4 active beacon) from a neighboring mobile device (e.g., "N1") 30, and the perimeter device (e.g., "D") 16 sending the data packets 28a and 28b to the root network device "R" 12 indicating detection of the mobile device (e.g., "N1") 30. As illustrated in FIG. 1, the perimeter device "D" 16 can generate and output copies 28a and 28b of a data packet to provide improved reliability in the root network device "R" 12 receiving at least one of the copies 28a or 28b. The perimeter device "D" 16 can generate and output a data packet 28b via its default parent network device "C" 16 for delivery of the data packet 28b via the distance vector-protocol path "P1" 22a, where the data packet 28b has its indicator set to identify the transmission direction toward the root network device "R" 12; the perimeter device "D" 16 also can generate and output a copy 28a via the perimeter topology 14 toward its child junction device "J" 20 (based on a stored route entry generated based on a received destination advertisement object (DAO) message), where the data packet 28a specifies the indicator identifying the transmission direction away from the root network device "R" 12.

Hence, the junction device "J" 20 can change the indicator in the data packet 28a (received from the distance vector-protocol path "P1" 22a) to specify the data packet 28a' is transmitted in a direction toward the root network device "R" 12, and forward the data packet 28a' to the root network device "R" 12 via the distance vector-protocol path "P2" 22b.

Figure 2A:
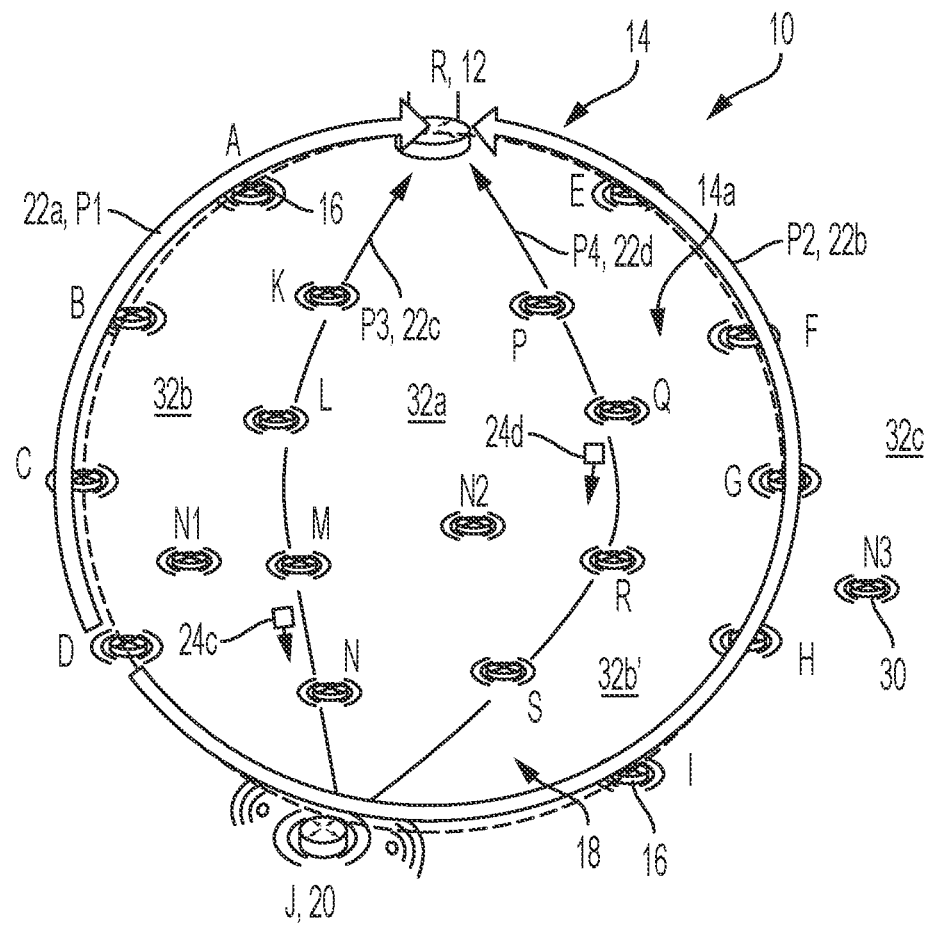
FIGS. 2A and 2B illustrate respective second perimeter topologies added to the perimeter topology of FIG. 1, for establishment of detection corridors in the perimeter topology, according to an example embodiment.
Figure 2B:
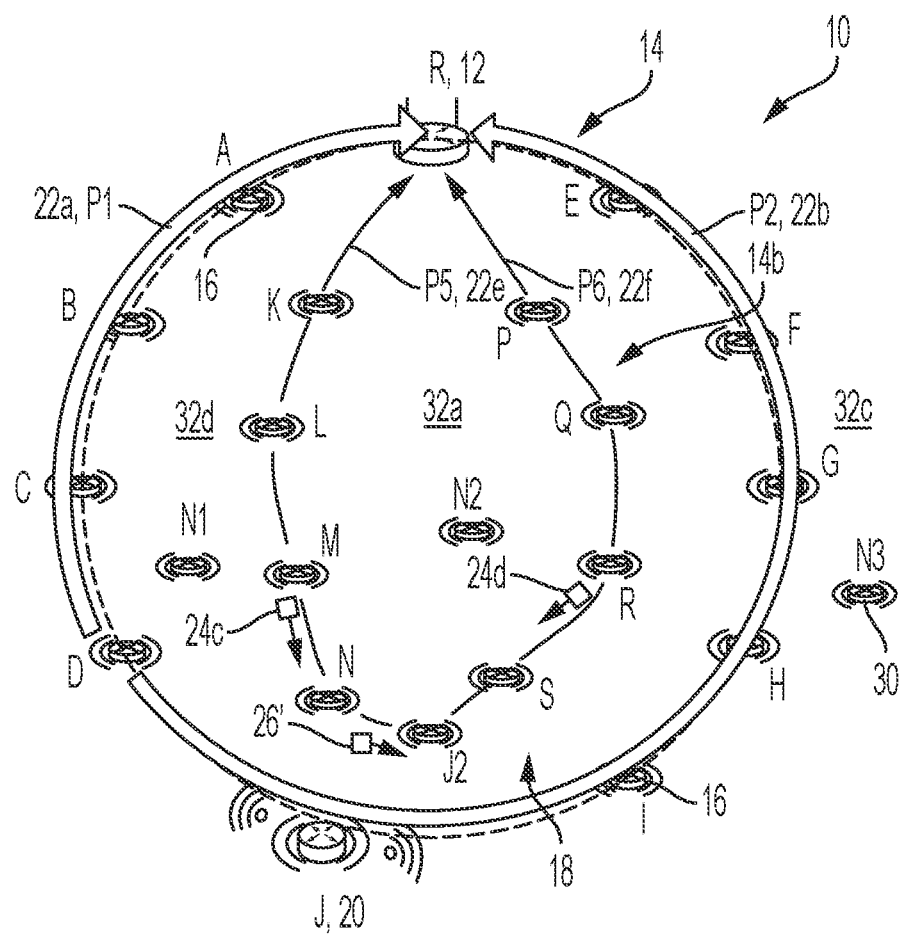

FIGS. 2A and 2B illustrate respective second perimeter topologies 14a and 14b added to the perimeter topology 14 of FIG. 1, for establishment of detection corridors 32a, 32b and 32b' (or 32d), and 32c in the perimeter topology 14, according to an example embodiment. As described in further detail below, the root network device "R" 12 can output additional DIO advertisement messages 24c and 24d that cause formation of the distance vector-protocol path "P3" 22c (comprising third network devices "K", "L", "M", and "N" 16) and the distance vector-protocol path "P4" 22d (comprising the fourth network devices "P", "Q", "R", and "S" 16) in FIG. 2A, respectively; the DIO advertisement messages 24c and 24d also can cause the formation of the distance vector-protocol path "P5" 22e (comprising third network devices "K", "L", "M", and "N" 16) and the distance vector-protocol path "P6" 22f (comprising the fourth network devices "P", "Q", "R", and "S" 16) in FIG. 2B in the case where a second junction device "J2" 20 has received a corresponding instruction message 26' to operate as a junction for the perimeter topology 14b comprising the distance vector-protocol path "P5" 22e and the distance vector-protocol path "P6" 22f.

Hence, the root network device "R" 12 can identify whether a mobile device (e.g., "N2") 30 is within the detection corridor 32a based on receiving respective notification messages (identifying the detection of a beacon message from the mobile device "N2" 30) only by one or more of the third or fourth network devices 16 in the second perimeter topology 14a or 14b; the root network device "R" 12 also can identify whether a mobile device (e.g., "N1") is within the detection corridor 32b or 32b' of FIG. 2A, or the detection corridor 32d of FIG. 2B, based on receiving respective notification messages by one or more of the third or fourth network devices (in any of the paths "P3", "P4", "P5", or "P6") in the "inner" perimeter topology 14a or 14b (e.g., "M"), and by one or more devices (e.g., "A" through "J") of the "outer" perimeter topology 14 (e.g., "D"). The root network device "R" 12 also can identify whether a mobile device (e.g., "N3") 30 is within the detection corridor 32c based on receiving a notification message only from one or more of the perimeter devices "A" through "J" of the outer perimeter topology 14 and none of the network devices of the inner perimeter topology 14a or 14b.

Hence, the example embodiments enable low-cost deployment of a precise perimeter surveillance and detection network having numerous detection corridors 32, for precise location detection of mobile devices 30 in a scalable and economic manner that can be implemented without expensive GNSS circuitry that cannot be used in indoor environments. A mobile device 30 can be localized within the detection corridor 32a, 32b, 32b', 32c, or 32d based on received signal strength (RSSI), Difference of Time-of-Arrival (DTOA) localization, and/or approximate point in test (APIT) operations, a range free WSN localization operations, etc.

The example embodiments can be used for monitoring mobile devices 30 within and around the prescribed detection area 18, enabling a management device (via the root network device "R" 12) to send a redirect instruction to any mobile device 30 that is approaching or outside the perimeter established by the perimeter topology 14. The redirect instruction can cause the mobile device 30 to execute corrective action to stay within the prescribed detection area 18, for example activating a low intensity discharge to discourage animals (e.g., dogs, cattle, etc.) from passing a virtual fence; the redirect instruction also can include directional vectors that enable a movable "drone" device (e.g., UAV) to turn away from the perimeter, for example to compensate for drift due to wind. In the case of discouraging animals from passing a virtual fence, the root network device "R" 12 also can transmit an alert trigger that causes a perimeter device 16 along the perimeter topology 14 (e.g., the perimeter device "D" 16) to trigger a flash strobe, an audible siren, recorded animal roar, etc., causing an animal to turn back toward the center of the prescribed detection area 18.

Hence, the example embodiments can be used for monitoring a prescribed detection area in indoor or underground environments; the example embodiments also can be used for monitoring various mobile objects, for example livestock on farmlands or ranches, wildlife in wilderness preserves, individuals within a prescribed area (e.g., refugees within a protected area), where each mobile object (IoT device or "drone"), animal or person can be equipped with a mobile device 30 implemented for example as an RFID tag. Depending on implementation, the mobile device 30 can be implemented as a mobile functional device (MFD) operable as a RPL-unaware leaf according to RFC 9010, or as a RPL device that can attach to one of perimeter devices 16 via a RPL instance that is separate and distinct from the perimeter topology 14, 14a, or 14b. The example embodiments also can be implemented in a movable prescribed detection area 18, for example in the case where the wireless data network 10 is implemented as a fleet of low-cost unmanned aerial vehicles (UAVs) that can travel together in a swarm pattern, where the perimeter devices 16 can identify the detection corridors 32a within the swarm pattern as the wireless data network 10 travels through a defined three-dimensional (3D) space.

Although only the network devices "A" and "I", are labeled with the reference numeral "16" to avoid cluttering in the Figures, it should be apparent that all the network devices "A" through "I", "K" through "N" and "P" through "S" are allocated the reference numeral "16" for purposes of the description herein. It also should be apparent that the junction device "J2" of FIG. 2B is allocated the reference numeral "20", even though only the junction device "J" of FIGS. 1, 2A and 2B is labeled with the reference numeral "20". It also should apparent that even though only the mobile device "N3" is labeled with the reference numeral "30" to avoid cluttering, the mobile devices "N1" and "N2" are allocated the reference numeral "30" for purposes of the description herein.

Also note that the root network device "R" 12 can have a communication link with another network device (e.g., a management server, cloud-based management service, etc.) via a "backhaul" local and/or wide area network not shown in FIG. 1, for example wired or wireless data network such as a Wi-Fi network, a WiSUN network, a 5G carrier network, a satellite-based low-earth orbit (LEO) constellation network, etc.

Figure 3:
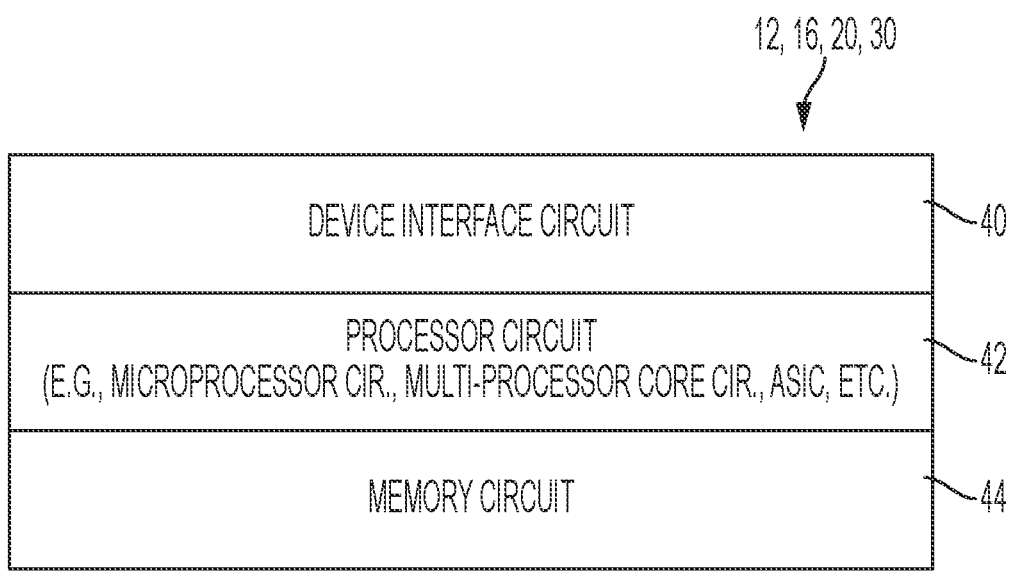
FIG. 3 illustrates an example implementation of any of the devices of FIG. 1, 2A, or 2B, according to an example embodiment.

FIG. 3 illustrates an example implementation of any one of the devices 12, 16, 20 and/or 30 of FIGS. 1A-1D, according to an example embodiment.

Each apparatus 12, 16, 20 and/or 30 can include a device interface circuit 40, a processor circuit 42, and a memory circuit 44. The device interface circuit 40 can include one or more distinct physical layer transceivers for communication with any one of the other devices 12, 16, 20 and/or 30; the device interface circuit 40 also can include an IEEE based Ethernet transceiver for communications with the devices of FIG. 1 via any type of data link (e.g., a wired or wireless link, an optical link, etc.). The processor circuit 42 can be configured for executing any of the operations described herein, and the memory circuit 44 can be configured for storing any data or data packets as described herein.

Any of the disclosed circuits of the devices 12, 16, 20 and/or 30 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network device via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 4A:
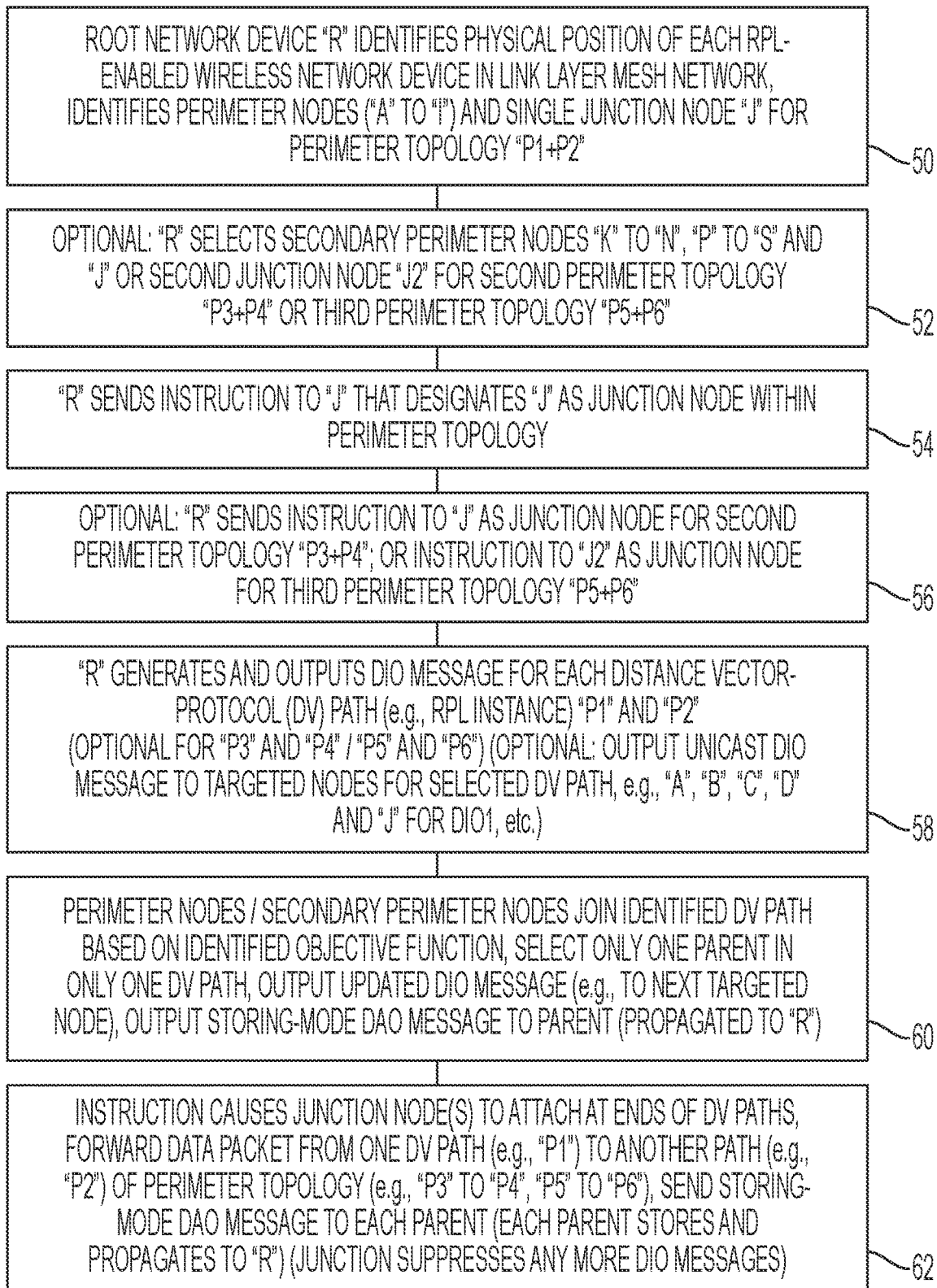
FIGS. 4A and 4B illustrate creation of the perimeter topologies of FIGS. 1, 2A, and 2B, and routing of data packets therein, according to an example embodiment.
Figure 4B:
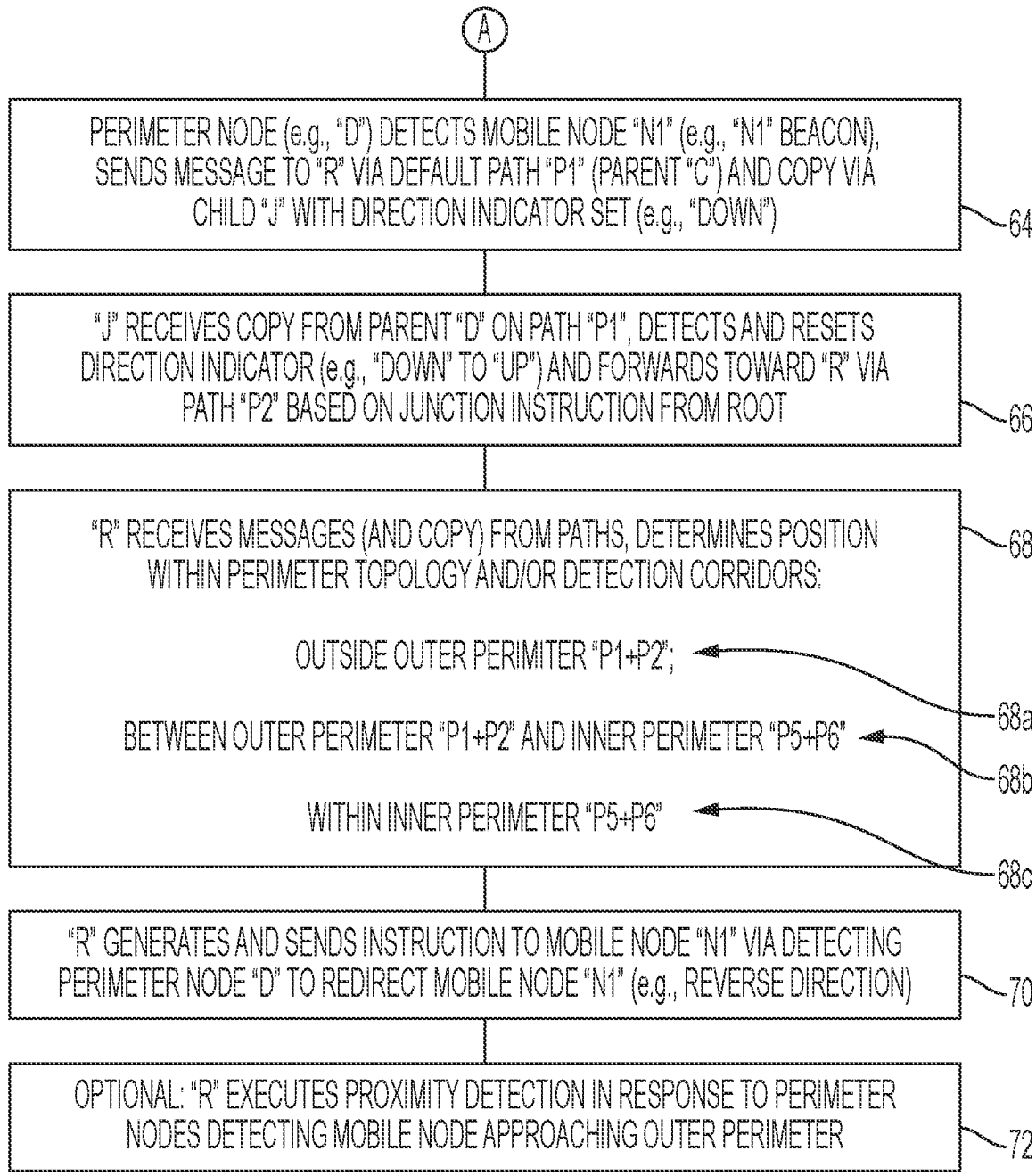

FIGS. 4A and 4B illustrate creation of the perimeter topologies of FIGS. 1, 2A, and 2B, and routing of data packets therein, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to operation 50 in FIG. 4A, the processor circuit 42 of the root network device "R" 12 can identify physical positions of each RPL-enabled wireless network device "A" through "S", including the junction device "J" 20 (and "J2" 20 of FIG. 2B), for example based on location-based surveys of the individual wireless network devices "A" through "S" that are deployed at prescribed physical positions (or locations) within a prescribed physical area. For example, a perimeter device 16 and/or a junction device "J" 20 can be positioned along identifiable fence posts installed along a property boundary of the prescribed detection area 18; each perimeter device 16 and the junction device "J" 20 also can be programmed with flight tracking instructions relative to a coordinate space defined by the root network device "R" 12, for example in the case where the root network device "R" 12 is a controller of a swarm of in-flight UAVs that maintain a prescribed formation for establishment of a three-dimensional detection area 18 as the root network device "R" 12 moves (e.g., flies) through a defined three-dimensional coordinate space via air, space, underwater, etc.

In response to the root network device "R" 12 in operation 50 identifying the physical location of each wireless network device "A" through "S" in the mesh network of the wireless data network 10, the processor circuit 42 of the root network device "R" 12 in operation 50 can identify perimeter devices "A" through "D" for the distance vector-protocol path "P1" 22a, perimeter devices "E" through "I" for the distance vector-protocol path "P2" 22b, and the junction device "J" 20 for the perimeter topology "P1+P2" 14 that comprises the distance vector-protocol path "P1" 22a, the distance vector-protocol path "P2" 22b, and the junction device "J" 20 that joins the paths "P1" 22a and "P2" 22b to form the perimeter topology 14 of FIG. 1.

The processor circuit 42 of the root network device "R" 12 in operation 52 optionally also can create the perimeter topology 14a of FIG. 2A or the perimeter topology 14b of FIG. 2B based on selecting, based on their respective physical positions, secondary perimeter devices "K" to "N" as a third group of network devices for the distance vector-protocol path "P3" 22c or 22e, and the perimeter devices "P" through "S" as a fourth group of network devices for the distance vector-protocol path "P4" 22d or 22f. The processor circuit 42 of the root network device "R" 12 in operation 52 also can select the junction device "J" 20 as the junction for the distance vector-protocol path "P3" 22c and the distance vector-protocol path "P4" 22d for formation of the perimeter topology "P3+P4" 14a in FIG. 2A; the processor circuit 42 of the root network device "R" 12 in operation 52 alternately can select a junction device "J2" 20 as the junction for the distance vector-protocol path "P5" 22e and the distance vector-protocol path "P6" 22f for formation of the perimeter topology "P5+P6" 14b in FIG. 2B.

As apparent from the foregoing, operations 50 and 52 also can be implemented by a management device (not shown) that identifies the devices 12, 16, and 20 in the topologies 14, 14a, and/or 14b, where the management device can generate the instruction messages and DIO messages 24 to be output by the root network device "R" 12, described below.

The wireless mesh data network 10 can be implemented as a personal area network (PAN) or a field area network (FAN), for example, as an IEEE 802.15.4e/g based connected grid mesh (CG-mesh) network. The root network device "R" 12 can be implemented, for example, as a commercially-available Cisco® 1000 Series Connected Grid Router (CGR) from Cisco Systems, San Jose, California, that is modified as described herein; hence, the root network device "R" 12 also can be referred to as a DAG root 12, a DODAG root 12. The root network device 12 can establish the perimeter topology 14, 14a and 14b, based on outputting DODAG information object (DIO) messages 24a, 24b, 24c, and/or 24d, for example according to the Internet Engineering Task Force (IETF) Request for Comments (RFC) 6550.

Each wireless mesh network device (or LLN device) 16 or 20 can be implemented as a constrained network device, or "LLN device" or "CG-mesh" device, configured for operating for example as a RPL device according to the Internet Engineering Task Force (IETF) Request for Comments (RFC) 6550. Each wireless mesh network device (or LLN device) 16 or 20 in the wireless data network 10 typically is constrained by processing power, memory, and energy (e.g., battery power); interconnecting wireless data links between the wireless mesh network device (or LLN device) 16 or 20 typically are constrained by high loss rates, low data rates, and instability with relatively low packet delivery rates.

A network topology (e.g., a "RPL instance" according to RFC 6550) 22 can be established based on creating routes toward a single "root" network device 12 in the form of a directed acyclic graph (DAG) toward the root network device 12, where all routes in the LLN terminate at the root network device 12 (also referred to as a "DAG destination"). Hence, the DAG also is referred to as a Destination Oriented DAG (DODAG). Network traffic can move either "up" towards the DODAG root 12 or "down" towards the DODAG leaf devices (e.g., a junction device "J" or "J2" 20).

Downward routes (i.e., away from the root network device "R" 12) can be created based on unicast Destination Advertisement Object (DAO) messages 22 that are created by a wireless mesh network device (or LLN device) 16 or 20 and transmitted to a corresponding parent device 16 and/or the root network device "R" 12. Hence, each perimeter device 16 operating in storing mode (and the root network device "R" 12) can store a route entry in response to receiving a storing-mode DAO message sent in operation 62 by a child network device, enabling the perimeter device 16 (and/or the root network device "R" 12) to store in the route entry a downward path for reaching a child network device. As apparent from the foregoing, the root network device "R" 12 has route entries for reaching any network device in the wireless data network 10 via an identified next-hop child device (e.g., "A", "E", "K", or "P") 16.

Hence, the processor circuit 42 of the root network device "R" 12 in operation 54 can generate and send an instruction message 26 to the junction device "J" 20 that designates the network device "J" as a junction device 30; as described below, the instruction message 26 causes the junction device "J" 20 to join both the distance vector-protocol path "P1" 22a in response to receiving the DIO advertisement message 24a from the perimeter device "D" 16, and the distance vector-protocol path "P2" 22b in response to receiving the DIO advertisement message 24b from the perimeter device "I" 16.

The processor circuit 42 of the root network device "R" 12 in operation 56 optionally also can generate and send to the junction device "J" 20 an instruction (e.g., within the same instruction message 26) that designates the junction device "J" 20 as a junction device for the second perimeter topology 14a of FIG. 2A. Hence, the instruction in operation 56 can cause the junction device "J" 20 to join the distance vector-protocol path "P3" 22c based on attaching to the network device "N" (in response to a corresponding DIO message 24c output by the network device "N"), and the junction device "J" 20 further joining the distance vector-protocol path "P4" 22d based on attaching to the network device "S" (in response to a corresponding DIO message 24d output by the network device "S"). Hence, as illustrated in FIG. 2A, the junction device "J" 20 can attach to the separate and distinct distance vector-protocol paths "P1" 22a, "P2" 22b, "P3" 22c, and "P4" 22d, where each distance vector-protocol path 22 can be implemented as a separate RPL instance, according to RFC 6550, that generates a corresponding single-line path that spans away from the root network device "R" 12.

The processor circuit 42 of the root network device "R" 12 in operation 58 can generate and send advertisement messages 24 that cause the perimeter devices 16 to attach to only one parent of only one of the distance vector-protocol paths 22, and that cause a junction device "J" 20 to attach to two or more of the distance vector-protocol paths 22. In one example, each perimeter device 16 and each junction device "J" 20 can include two directional antennas that are positioned toward a neighboring perimeter device 16 in the associated distance vector-protocol path 22, causing enabling formation of a clockwise path and a counter-clockwise path in each perimeter topology 14 via the junction device "J" 20 or the junction device "J2" 20.

As described below, each data packet 28 can include an indicator associated with clockwise transmission (e.g., set in the data packet 28b output by the perimeter device "D" 16), or a counter-clockwise transmission (e.g., set in the data packet 28a output by the perimeter device "D" 16).

According to example embodiments, each distance vector-protocol path 22 can be implemented as a separate RPL instance that specifies an objective function that utilizes signal strength (e.g., RSSI) to identify a preferred parent, and that requires that a receiving network device in operation 60 attaches to only one parent of only one distance vector-protocol path 22; hence, a perimeter device (e.g., "B") 16 that joins in operation 60 the distance vector-protocol path "P1" 22a in response to receiving the DIO advertisement message 24a cannot join any of the distance vector-protocol paths 22b, 22c, 22d, 22e, or 22f, even though they are separate RPL instances. Hence, the objective function that utilizes signal strength (e.g., RSSI) can ensure that the RPL instance of each distance vector-protocol path 22 forms a line (i.e., a "sequence") of perimeter devices 16 having only one parent network device and no more than one child network device. Hence, each perimeter device 16 that attaches to an advertising parent network device can update and retransmit only the corresponding DIO advertisement message 24 for the corresponding distance vector-protocol path 22 to which it has joined.

In an optional embodiment, the root network device "R" 12 in operation 58 also can output directed DIO messages that identify the targeted devices to be added to a distance vector-protocol path 22; hence, the root network device "R" 12 can specify, within one or more DIO messages 24a, that the network devices "A", "B", "C", "D" and "J" are intended destination targets of the DIO advertisement message 24a for formation of the corresponding distance vector-protocol path "P1" 22a in a wireless mesh network 10 having a dense collection of wireless network devices.

Hence, as illustrated with respect to FIG. 1, the DIO advertisement message 24a output by the root network device "R" 12 can cause generation of the distance vector-protocol path "P1" 22a comprising the sequence of perimeter devices "A", "B", "C", "D" 16 and the junction device "J" 20, based on each of the perimeter devices "A", "B", "C", "D" 16 receiving in operation 60 the DIO advertisement message 24a. The DIO advertisement message 24b output by the root network device "R" 12 can cause generation of the distance vector-protocol path "P2" 22b comprising the sequence of perimeter devices "E", "F", "G", "H", "I" 16, based on each of the perimeter devices "E", "F", "G", "H", "I" 16 and the junction device "J" 20 receiving in operation 60 the DIG advertisement message 24b.

The DIG advertisement message 24c output by the root network device "R" 12 can cause generation of the distance vector-protocol path "P3" 22c of FIG. 2A (or the distance vector-protocol path "P5" 22e of FIG. 2B) comprising the sequence of perimeter devices "K", "L", "M", and "N", based on each of the perimeter devices "K", "L", "M", and "N" receiving in operation 60 the DIO advertisement message 24c.

The DIG advertisement message 24d output by the root network device "R" 12 can cause generation of the distance vector-protocol path "P4" 22d of FIG. 2A (or the distance vector-protocol path "P6" 22f of FIG. 2B) comprising the sequence of perimeter devices "P", "Q", "R", and "S", based on each of the perimeter devices "P", "Q", "R", and "S" receiving in operation 60 the DIG advertisement message 24d. As described previously, each perimeter device 16 can respond to attaching to a distance vector-protocol path 22 by updating its received DIO message 24 with its corresponding rank (if relevant for the objective function), and outputting the updated DIO message 24.

As described previously, each instruction message 26 causes each junction device "J" (and/or "J2" of FIG. 2B) 20 to join two or more distance vector-protocol paths 22 in response to receiving the associated DIO messages 24. In particular, the root network device "R" 12 can set, for use by each junction device 20, an objective function that computes a rank that is comparable between RPL instances 22, where a junction device 20 can select a "plan B" feasible successor in another instance RPL instance 22 as long as that parent has a rank (in its corresponding RPL instance 22) that is less than the corresponding rank of the junction device 20. Hence, the RPL rank of the junction device 20 has a comparable distance between the two instances, such that the Distance Vector operation guarantees loop avoidance as a packet is transmitted in either distance vector-protocol path 22. The new objective function (OF) operation has the following steps: the OF executed in a junction device 20 selects exactly one parent in the current instance 22, so the instance can form a line; the OF executed by the junction device 20 scans for an alternate RPL instance 22 identified by a different DIO advertisement message 24; if an alternate DIO advertisement message 24 is detected, the OF selects a "plan B" parent there as if it was part of that different instance 22.

Hence, the junction device "J" 20 in operation 62 can join at least the distance vector-protocol path "P1" 22a and the distance vector-protocol path "P2" 22b in response to the respective DIO advertisement messages 24a and 24b, and optionally join the distance vector-protocol path "P3" 22c and the distance vector-protocol path "P4" 22d (if specified in the instruction message 26) in response to receiving the DIO advertisement message 24c and the DIO advertisement message 24d, respectively, as illustrated in FIG. 2A. Alternately, the junction device "J2" 20 in operation 62 can join the distance vector-protocol path "P3" 22c and the distance vector-protocol path "P4" 22d in response to receiving the DIO advertisement message 24c and the DIO advertisement message 24d, respectively, illustrated in FIG. 2B. Each junction device "J" 20 and junction device "J2" 20 also suppresses any further retransmissions of any received DIO advertisement message 24, as a junction device terminates all of the linear distance vector-protocol paths 22.

Each junction device "J" 20 and "J2" 20 also can output a storing-mode DAO message to each parent device for the corresponding instance of a distance vector-protocol path 22. Hence, the junction device "J" 20 can output a first storing-mode DAO message to its parent device "D" 16 for the distance vector-protocol path "P1" 22a, and a second storing-mode DAO message to its parent device "I" 16 for the distance vector-protocol path "P2" 22b. The junction device "J" 20 also can specify in the first storing-mode DAO message that the junction device "J" 20 is a junction node for the distance vector-protocol path "P1" 22a to a counterpart distance vector-protocol path (namely "P2" 22b); the junction device "J" 20 also can specify in the second storing-mode DAO message that the junction device "J" 20 is a junction node for the distance vector-protocol path "P2" 22b to a counterpart distance vector-protocol path (namely "P1" 22a).

Hence, the parent perimeter device "D" 16 can respond to the first storing-mode DAO message by storing a route entry specifying that a junction for the distance vector-protocol path "P1" 22a is reachable via the attached child junction device "J" 20; the parent perimeter device "D" 16 can forward the first storing-mode DAO message to its default parent "C" perimeter device 16, enabling the perimeter device "C" to store a route entry specifying a junction for the distance vector-protocol path "P1" 22a is reachable via the attached child perimeter device "D" 16; the parent perimeter device "C" 16 can forward the first storing-mode DAO message to its default parent "B" perimeter device 16, enabling the perimeter device "B" to store a route entry specifying a junction for the distance vector-protocol path "P1" 22a is reachable via the attached child perimeter device "C" 16; the parent perimeter device "B" 16 can forward the first storing-mode DAO message to its default parent "A" perimeter device 16, enabling the perimeter device "A" to store a route entry specifying a junction for the distance vector-protocol path "P1" 22a is reachable via the attached child perimeter device "B" 16; and the parent perimeter device "A" 16 can forward the first storing-mode DAO message to its default root parent "R" 12, enabling the root network device "R" 12 to store a route entry specifying a junction for the distance vector-protocol path "P1" 22a is reachable via the attached child perimeter device "A" 16.

Hence, the first storing-mode DAO message initiated by the junction device "J" 20 can be propagated to the root network device "R" 12 via the sequence of perimeter devices 16 along the first distance vector-protocol path "P1" 22a. As apparent from the foregoing, the second storing-mode DAO message can be stored and propagated by each of the perimeter devices 16 in the sequence along the second distance vector-protocol path "P2" 22b to the root network device "R" 12.

Additional options can be added to enable "non-perimeter" network devices to attach as children to a perimeter device 16 in response to detecting a DIO message from the perimeter device, for formation of a "fishbone" type distance vector-protocol path 22. As described previously, the root network device "R" 12 can specify whether a network device in the wireless data network operates as a perimeter network device 16 or a junction device 20; hence, any "undesignated" network device (i.e., that is not designated as a perimeter network device or a junction device) for any distance vector-protocol path 22 can be configured to prevent a perimeter network device 16 or a junction device 20 from attaching to an undesignated network device in any perimeter topology 14. In one example, a perimeter network device 16 or a junction device 20 can be configured with an objective function that prevents attachment to an advertising parent unless the DIO message specifies the advertising parent is a perimeter network device 16 (or the root network device 12); in another example, a perimeter network device 16 or a junction device 20 can be configured with an objective function that prevents attachment if the DIO message specifies the advertising parent is not a perimeter network device 20.

Hence, the above-described options enable limited attachments by non-perimeter network devices to attach to a perimeter network device 16, while preventing other perimeter network devices 16 from attaching to a non-perimeter network device. The above-described options thus enable formation of a "fishbone" type distance vector-protocol path 22 comprising the sequence of the perimeter network devices 16 ending with the junction device 20 at the end of the distance vector-protocol path 22, and further comprising zero or more non-perimeter network devices each having only a single attachment to one of the root network device "R" 12, one of the perimeter network devices 16, the junction device "J" 20, or another attached non-perimeter network device. If desired, the "fishbone" type distance vector-protocol path 22 can be further limited by allowing each non-perimeter network device to attach only as a leaf network device to only one of the root network device "R" 12, one of the perimeter network devices 16, or the junction device "J" 20.

Consequently, the junction device "J" 20 and/or the junction device "J2" 20 can transfer a data packet 28 from a first distance vector-protocol path "P1" 22a to a second distance vector-protocol path "P2" 22b, for transfer to the root network device "R" 12.

Referring to FIG. 4B, a perimeter device (e.g., "D") 16 in operation 64 can detect a mobile device (e.g., "N1") 30, for example based on the mobile device "N1" 30 transmitting a link layer beacon. As described previously, each DIG advertisement message 24a and 24b can specify that each perimeter device 16 can selectively replicate and transmit a data packet 28 (originated by a network device that is not part of any perimeter topology 14, 14a, or 14b) toward the root network device "R" 12 and away from the root network device "R" via an attached child network device.

Hence, the perimeter device "D" 16 can respond in operation 64 to detecting the mobile device "N1" 30 by generating and sending a data packet 28b to the root network device "R" 12 via its default path parent "C" 16 along the distance vector-protocol path "P1" 22a; as described previously, the perimeter device "D" 16 can set in the data packet 28b an indicator indicating the data packet 28b is traveling "UP" (i.e., toward the root network device "R" 12 in the distance vector-protocol path "P1" 22a) in the clockwise direction. The perimeter device "D" 16 in operation 64 also can generate and send a data packet 28a to the root network device "R" 12 via is child "J" in the distance vector-protocol path "P1" 22a, where the data packet 28a can include an indicator set by the perimeter device "D" 16 and indicating that the distance vector-protocol path "P1" 22a is traveling "DOWN" (i.e., away from the root network device "R" 12 in the distance vector-protocol path "P1" 22a) in the counter-clockwise direction. A similar operation can be executed by the perimeter device "M" in FIG. 2A or 2B of sending data packets 28a and 28b "DOWN" and "UP" the distance vector-protocol path "P3" 22c, respectively, causing the data packet 28a to be forwarded "DOWN" along the distance vector-protocol path "P3" 22c to the junction device "J" 20 (or the junction device "J2" 20 in FIG. 2B), and the data packet 28b to be forwarded "UP" along the distance vector-protocol path "P3" 22c to the root network device "R" 12.

The junction device "J" 20 in operation 66 can receive the copy data packet 28a from the parent perimeter device "D" 16 in the distance vector-protocol path "P1" 22a (and optionally a corresponding copy data packet 28a from the parent network device "N" 16 in the distance vector-protocol path "P3" 22c). The junction device "J" 20 in operation 66 can detect the indicator "DOWN" indicator for the distance vector-protocol path "P1" 22a, reset the indicator to "UP" for the counterpart distance vector-protocol path "P2" 22b of the perimeter topology 14, and output the data packet 28a' toward the root network device "R" 12 via the distance vector-protocol path "P2" 22b. As apparent from the foregoing, the junction device "J" 20 can store in its memory circuit 44 a route table entry that maps traffic received from the distance vector-protocol path "P1" 22a to the distance vector-protocol path "P2" 22b of the same perimeter topology 14, and a second route table entry that maps traffic received from the distance vector-protocol path "P2" 22b to the distance vector-protocol path "P1" 22a of the same perimeter topology 14, for example based on mapping information received from the instruction message 26 sent by the root network device "R" 12 to the junction device "J" 20.

Hence, the junction device "J" 20 in operation 66 (or the junction device "J2" 20 of FIG. 2B) also can forward any copy of a data packet 28a received from the distance vector-protocol path "P3" 22c to the corresponding parent network device "S" 16 in the distance vector-protocol path "P4" 22d after changing the indicator from "DOWN" to "UP", for delivery of the root network device "R" 12 via the distance vector-protocol path "P4" 22d.

Hence, the device interface circuit 40 of the root network device "R" 12 in operation 68 can receive at least two copies 28a and 28b from each perimeter topology 14, for example the data packet 28a via the distance vector-protocol path "P2" 22b and the data packet 28b via the distance vector-protocol path "P1" 22a. As illustrated in FIGS. 2A and 2B, the root network device "R" 12 also can receive in operation 68 a data packet 28b (originated by the perimeter device "M" 16) via the distance vector-protocol path "P3" 22c or the distance vector-protocol path "P5" 22e, and the root network device "R" 12 can receive the data packet 28a (originated by the perimeter device "M" 16) via the distance vector-protocol path "P4" 22d or the distance vector-protocol path "P6" 22f.

Hence, the processor circuit 42 of the root network device "R" 12 in operation 68 can determine a position of the mobile device "N1" 30 in response to the data packet 28a and the data packet 28b generated and output by the perimeter device "D" 16 onto the perimeter topology 14 of FIG. 1, and optionally the corresponding data packet 28a and data packet 28b generated and output by the perimeter device "M" 16 onto the perimeter topology 14a of FIG. 2A or the perimeter topology 14b of FIG. 2B.

In the case of a second perimeter topology 14a or 14b, the processor circuit 42 of the root network device "R" 12 in operation 68 can identify whether a mobile device 30 is within a particular detection corridor 32, for example: the root network device "R" 12 can identify in operation 68a that a mobile device (e.g., "N3") 30 is within the detection corridor 32c (outside the outer perimeter topology "P1+P2" 14) based on receiving a notification message only from one or more of the perimeter devices "A" through "J" of the outer perimeter topology 14 and none of the network devices of the inner perimeter topology 14a or 14b.

The root network device "R" 12 can identify in operation 68b that a mobile device (e.g., "N1") is within the detection corridor 32b or 32b' of FIG. 2A, or the detection corridor 32d of FIG. 2B, based on receiving respective notification messages by one or more of the third or fourth network devices (in any of the paths "P3", "P4", "P5", or "P6") in the "inner" perimeter topology 14a or 14b (e.g., "M"), and by one or more devices (e.g., "A" through "J") of the "outer" perimeter topology 14 (e.g., "D").

The root network device "R" 12 can identify in operation 68c that a mobile device (e.g., "N2") 30 is within the detection corridor 32a based on receiving respective notification messages (identifying the detection of a beacon message from the mobile device "N2" 30) only by one or more of the third or fourth network devices 16 in the second perimeter topology 14a or 14b and none of the perimeter devices of the outer perimeter topology 14.

Hence, the processor circuit 42 executed in the root network device "R" 12 in operation 70 can generate and send an instruction to a detected mobile device "N1" 30 (via the neighboring perimeter device "D" 16) that causes the mobile device "N1" 30 to reverse direction, for example in the case of the mobile device "N1" 30 implemented on a UAV. As described previously, the processor circuit 42 executed in the root network device "R" 12 in operation 70 also can generate and send to the neighboring perimeter device "D" 16 an instruction to sound an audible and/or visual alert to induce a person, animal, etc. to turn away from the perimeter topology 14 and to return toward the center of the prescribed detection area 18.

As apparent from the foregoing, the example embodiments also can be used for intrusion detection or detection of a lost asset returning to the prescribed detection area 18. Hence, the example embodiments enable the root network device "R" 12 in operation 72 to execute proximity detection operations in response to detecting that the mobile device "N3" 30 is approaching the perimeter topology 14; depending on the use of the perimeter topology 14, the proximity detection operation can be associated with remotely opening a door or gate near the associated perimeter device "H" 16, notifying guards, farm hands, rescue personnel, etc. of the arrival of the mobile device "N3" 30, etc.

According to example embodiments, a low-cost perimeter detection system can be deployed based on enhanced modifications to RPL as described herein. The example embodiments can modify RPL in order to form perimeter topologies comprising two or more linear distance vector-protocol paths that are initiated at a root network device and joined by one or more junction devices. Location precision can be improved based on generating concentric perimeter topologies having respective sets of linear distance vector-protocol paths joined by a junction device.

As described previously, the example embodiments also can be deployed as a three-dimensional (3D) perimeter detection system for tracking of movable objects within a 3D detection area, for example a movable 3D detection area that follows a flight path of the root network device that establishes and maintains the perimeter topology.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
    creating, by a root network device in a wireless data network, a perimeter topology comprising a first distance vector-protocol path of a first group of perimeter devices and a second distance vector-protocol path of a second group of the perimeter devices, the creating comprising outputting first and second advertisement messages causing the perimeter devices to attach to only one parent of only one of the first or second distance vector-protocol paths and a junction device to attach at respective ends of the first and second distance vector-protocol paths, wherein the junction device is designated as the junction device within the perimeter topology by the root network device; and
    causing, by the root network device, the junction device to forward, from the first distance vector-protocol path, a data packet toward the root network device via the second distance vector-protocol path.

2. The method of claim 1, wherein the creating further comprises:
    identifying the perimeter devices and the junction device at respective identified physical locations; and
    sending, to the junction device, an instruction that designates the junction device within the perimeter topology, the instruction causing the junction device to attach to the first and second distance vector-protocol paths and forward the data packet from the first distance vector-protocol path to the second distance vector-protocol path.

3. The method of claim 1, wherein the creating further comprises causing the junction device to change an indicator in the data packet, indicating a direction of the data packet, from a first direction away from the root network device to a second direction toward the root network device.

4. The method of claim 1, wherein:
the creating further comprises causing the junction device to send, via the first and second distance vector-protocol paths, a storing-mode destination advertisement object (DAO) message that causes each perimeter device to store a route entry for reaching the junction device via a corresponding child network device; and
the route entry enabling a corresponding perimeter device to send the data packet, received from a neighboring network device, toward the junction device via the corresponding child device, and a copy of the data packet to the root network device based on one of the corresponding first or second advertisement message received by the perimeter device.

5. The method of claim 1, wherein the creating further includes generating, as the first and second advertisement messages, respective first and second Destination Oriented Directed Acyclic Graph (DODAG) Information Object (DIO) message that specify attachment to only one parent, and selective replication and transmission of a received data packet toward the root network device and away from the root network device via an attached child network device.

6. The method of claim 5, wherein the creating further comprises causing the junction device to suppress transmission of the first and second DIO messages.

7. The method of claim 1, further comprising creating a second perimeter topology within the perimeter topology, based on:
generating and outputting a third advertisement message causing a third group of network devices to form a third distance vector-protocol path; and
generating and outputting a fourth advertisement message causing a fourth group of network devices to form a fourth distance vector-protocol path;
the perimeter topology and the second perimeter topology comprising respective detection corridors within the second perimeter topology, between the perimeter topology and the second perimeter topology, and outside the perimeter topology.

8. The method of claim 7, further comprising:
determining a position of a mobile device within one of the detection corridors based on determining whether:
the mobile device is detected only by one or more of the third or fourth network devices of the second perimeter topology;
the mobile device is detected by one or more of the third or fourth network devices and by one or more of the perimeter devices or the junction device; or
the mobile device is detected only by one or more of the perimeter devices or the junction device.

9. The method of claim 1, wherein each perimeter device has a corresponding prescribed position within a physical location.

10. One or more non-transitory tangible media encoded with logic for execution by a machine and when executed by the machine operable for:
creating, by the machine implemented as a root network device in a wireless data network, a perimeter topology comprising a first distance vector-protocol path of a first group of perimeter devices and a second distance vector-protocol path of a second group of the perimeter devices, the creating comprising outputting first and second advertisement messages causing the perimeter devices to attach to only one parent of only one of the first or second distance vector-protocol paths and a junction device to attach at respective ends of the first and second distance vector-protocol paths, wherein the junction device is designated as the junction device within the perimeter topology by the root network device; and
causing the junction device to forward, from the first distance vector-protocol path, a data packet toward the root network device via the second distance vector-protocol path.

11. The one or more non-transitory tangible media of claim 10, wherein the creating further comprises:
identifying the perimeter devices and the junction device at respective identified physical locations; and
sending, to the junction device, an instruction that designates the junction device within the perimeter topology, the instruction causing the junction device to attach to the first and second distance vector-protocol paths and forward the data packet from the first distance vector-protocol path to the second distance vector-protocol path.

12. The one or more non-transitory tangible media of claim 10, wherein the creating further comprises causing the junction device to change an indicator in the data packet, indicating a direction of the data packet, from a first direction away from the root network device to a second direction toward the root network device.

13. The one or more non-transitory tangible media of claim 10, wherein:
the creating further comprises causing the junction device to send, via the first and second distance vector-protocol paths, a storing-mode destination advertisement object (DAO) message that causes each perimeter device to store a route entry for reaching the junction device via a corresponding child network device; and
the route entry enabling a corresponding perimeter device to send the data packet, received from a neighboring network device, toward the junction device via the corresponding child device, and a copy of the data packet to the root network device based on one of the corresponding first or second advertisement message received by the perimeter device.

14. The one or more non-transitory tangible media of claim 10, wherein the creating further includes generating, as the first and second advertisement messages, respective first and second Destination Oriented Directed Acyclic Graph (DODAG) Information Object (DIO) message that specify attachment to only one parent, and selective replication and transmission of a received data packet toward the root network device and away from the root network device via an attached child network device.

15. The one or more non-transitory tangible media of claim 14, wherein the creating further comprises causing the junction device to suppress transmission of the first and second DIO messages.

16. The one or more non-transitory tangible media of claim 10, further operable for creating a second perimeter topology within the perimeter topology, based on:
generating and outputting a third advertisement message causing a third group of network devices to form a third distance vector-protocol path; and
generating and outputting a fourth advertisement message causing a fourth group of network devices to form a fourth distance vector-protocol path;
the perimeter topology and the second perimeter topology comprising respective detection corridors within the second perimeter topology, between the perimeter topology and the second perimeter topology, and outside the perimeter topology.

17. The one or more non-transitory tangible media of claim 16, further operable for:
  determining a position of a mobile device within one of the detection corridors based on determining whether:
  the mobile device is detected only by one or more of the third or fourth network devices of the second perimeter topology;
  the mobile device is detected by one or more of the third or fourth network devices and by one or more of the perimeter devices or the junction device; or
  the mobile device is detected only by one or more of the perimeter devices or the junction device.

18. An apparatus implemented as a physical machine, the apparatus comprising:
  non-transitory machine readable media configured for storing executable machine readable code;
  a device interface circuit configured for outputting first and second advertisement messages; and
  a processor circuit configured for executing the machine readable code, and when executing the machine readable code operable for:
    creating, by the apparatus implemented as a root network device in a wireless data network, a perimeter topology comprising a first distance vector-protocol path of a first group of perimeter devices and a second distance vector-protocol path of a second group of the perimeter devices, the creating comprising generating the first and second advertisement messages causing the perimeter devices to attach to only one parent of only one of the first or second distance vector-protocol paths and a junction device to attach at respective ends of the first and second distance vector-protocol paths, wherein the junction device is designated as the junction device within the perimeter topology by the root network device, and
    causing the junction device to forward, from the first distance vector-protocol path, a data packet toward the root network device via the second distance vector-protocol path.

19. The apparatus of claim 18, wherein the processor circuit further is configured for:
  identifying the perimeter devices and the junction device at respective identified physical locations; and
  sending, to the junction device, an instruction that designates the junction device within the perimeter topology, the instruction causing the junction device to attach to the first and second distance vector-protocol paths and forward the data packet from the first distance vector-protocol path to the second distance vector-protocol path.

* * * * *